Nov. 29, 1960 R. W. TOWNSEND 2,961,956

ARMING MECHANISM FOR A DEPTH CHARGE

Filed Jan. 6, 1947 7 Sheets-Sheet 1

Inventor
R. W. Townsend

By M. A. Hayes

Attorney

Nov. 29, 1960 R. W. TOWNSEND 2,961,956

ARMING MECHANISM FOR A DEPTH CHARGE

Filed Jan. 6, 1947 7 Sheets-Sheet 2

Inventor

R. W. Townsend

By M. C. Hayes

Attorney

Nov. 29, 1960 R. W. TOWNSEND 2,961,956

ARMING MECHANISM FOR A DEPTH CHARGE

Filed Jan. 6, 1947 7 Sheets-Sheet 3

Inventor

R. W. Townsend

By M. O. Hayes

Attorney

ARMING MECHANISM FOR A DEPTH CHARGE

Filed Jan. 6, 1947 7 Sheets-Sheet 4

Inventor

R. W. Townsend

By M. O. Hayes

Attorney

Nov. 29, 1960 R. W. TOWNSEND 2,961,956

ARMING MECHANISM FOR A DEPTH CHARGE

Filed Jan. 6, 1947 7 Sheets-Sheet 5

Inventor

R. W. Townsend

By M. A. Hayes

Attorney

Nov. 29, 1960　　R. W. TOWNSEND　　2,961,956

ARMING MECHANISM FOR A DEPTH CHARGE

Filed Jan. 6, 1947　　7 Sheets-Sheet 6

Inventor

R. W. Townsend

By M. O. Hayes

Attorney

ARMING MECHANISM FOR A DEPTH CHARGE

Filed Jan. 6, 1947 7 Sheets-Sheet 7

Inventor
R. W. Townsend

By M. A. Hayes
Attorney

United States Patent Office 2,961,956

Patented Nov. 29, 1960

2,961,956

ARMING MECHANISM FOR A DEPTH CHARGE

Richard W. Townsend, Flint, Mich.

Filed Jan. 6, 1947, Ser. No. 720,327

7 Claims. (Cl. 102—7)

(Granted under Title 35, U.S. Code (1952), sec. 266)

This invention relates generally to depth charges, mines or like devices and more particularly to a new and improved mechanism for moving an electroresponsive detonator into operative relation with an explosive charge associated therewith and to operate a plurality of current controlling elements in predetermined sequence during such movement, thereby to connect or electrically arm the detonator with respect to a firing circuit, the firing circuit being under the control of an influence type firing mechanism as the mine or depth charge, as the case may be, descends to a predetermined depth during the launching operation thereof.

It is an object of the present invention to provide a depth charge or the like having a hydrostatically controlled circuit controlling mechanism which selectively may be set at assembly to establish one or a number of circuits in response to pressures of predetermined values, the circuits thus established being operable, for example, to energize and electrically arm an automatic influence type firing mechanism as the depth charge moves within a preselected range during its descent through the water, and on passing out of this range either to fire the charge or sterilize it against possible future detonation.

Another object of the present invention is to provide a hydrostatically operated electrical arming system for a depth charge including means for causing the depth charge to respond only to gradual changes in pressure applied thereto as the depth charge descends within the water, whereby a shock or sudden increase of pressure, as might be caused, for example, by launching or countermining, will not cause a premature functioning of the device.

Furthermore, it is an object of the present invention, that various time delayed detonating units may be used in combination with the aforedescribed circuit controlling mechanism and by so doing to further increase its range of adjustment.

It is a further object of this invention to provide a device which is simple in construction yet highly efficient and dependable in its operation.

A still further object is to provide a device, the parts of which are suitable for confinement as a single compact interchangeable unit which is readily adaptable for quick assembly within a standard mine or depth charge.

Additional objects, features, and advantages of the present invention are those residing in and relating to the novel construction and arrangement of the elements thereof, as will more clearly appear as the description proceeds, reference being now made to the accompanying drawings of which:

Figure 1:
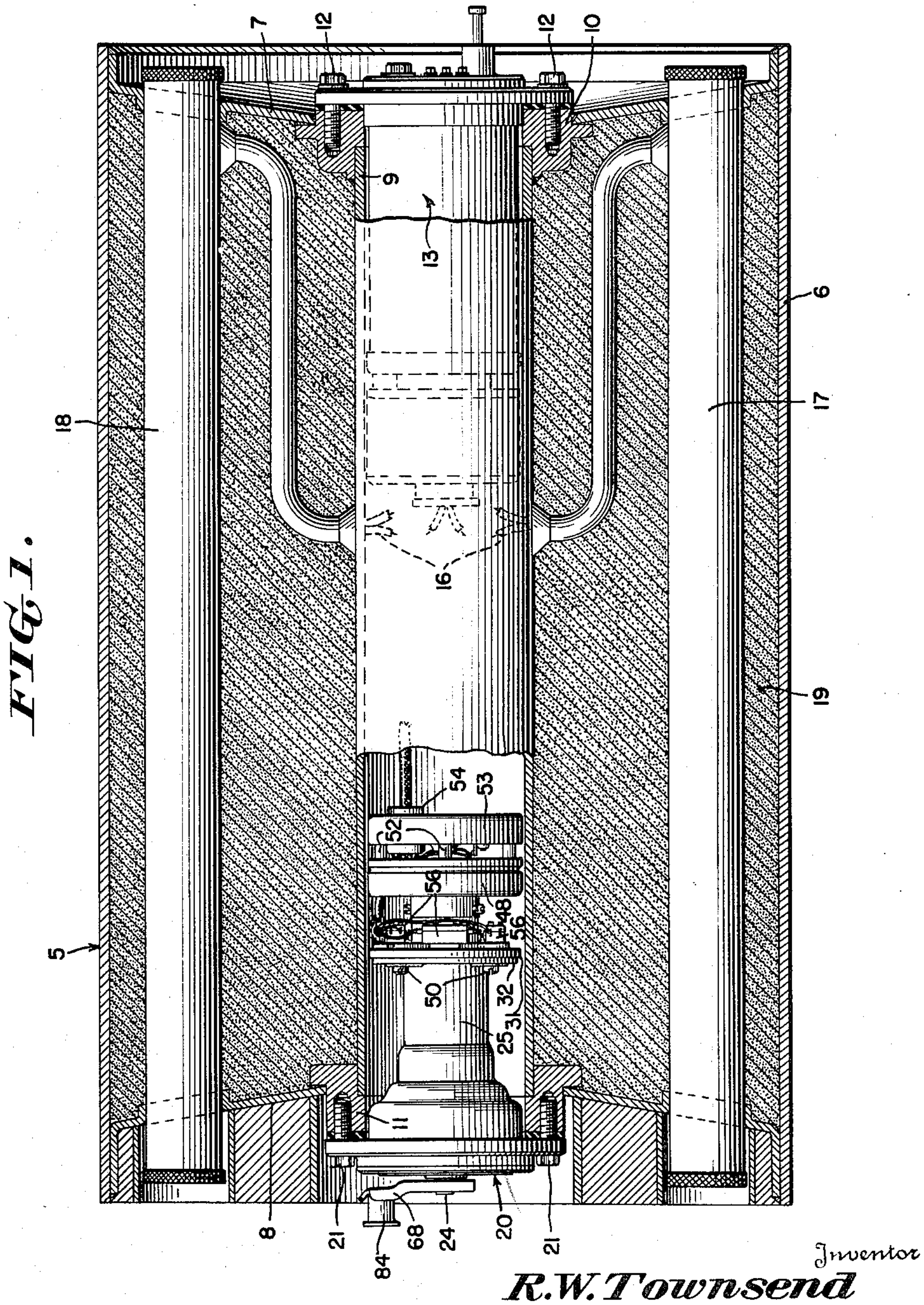
Fig. 1 is a view in section of a depth charge employing the device of the present invention according to a preferred embodiment thereof.

Referring to Fig. 1, the numeral 5 generally designates a mine or depth charge comprising the cylindrical casing or housing 6 having the ends thereof closed and sealed by the concave disks 7 and 8 secured in place as shown. Centrally arranged therein is the tubular member 9 provided with suitable adapters 10 and 11 for coupling this inner member with the closing disks 7 and 8 respectively. It is necessary here that all connections be welded or otherwise satisfactorily secured and sealed. Suspended within the said tubular member and secured thereto by bolts 12 is the automatic firing control mechanism generally referred to herein by the numeral 13. This firing control is preferably of the impulse type disclosed and claimed in the copending application of Waldron S. Macdonald et al., Serial No. 453,550, for a Firing Control Mechanism for a Depth Charge, filed August 4, 1942. Arranged within the opposite end of the tubular member 9 and secured thereto by bolts 21 is the pressure responsive control device 20. The operation of this control device will be more fully described as the description proceeds.

Forming a part of the automatic control and electrically connected therewith by leads 16 are a pair of gradiometer coils suitably enclosed within the spaced tubular members 17 and 18 respectively, along with control devices adapted to balance these coils with respect to each other sufficiently accurately as to prevent the generation of an electric signal should the coils be moved in any direction within a uniform magnetic field. These tubular members are capped in a suitable manner against moisture and securely sealed within apertures formed in the disks 7 and 8 respectively. When energized, the firing control mechanism 13 is operable, upon receiving an impulse signal from the gradiometer coils, to direct an impulse of current through leads 16 for firing an electric detonator for exploding the mine, as will be described in greater detail as the description proceeds. A switch hydrostatically controlled by the aforesaid control device 20 is interposed within the firing circuit for the detonator and operable to prevent possible energization of the detonator until such time as the depth charge has been properly submerged. Filling the unoccupied space within the cylindrical casing 6 is the main explosive charge 19, preferably composed of TNT cast within the cavity as shown.

Figure 2:
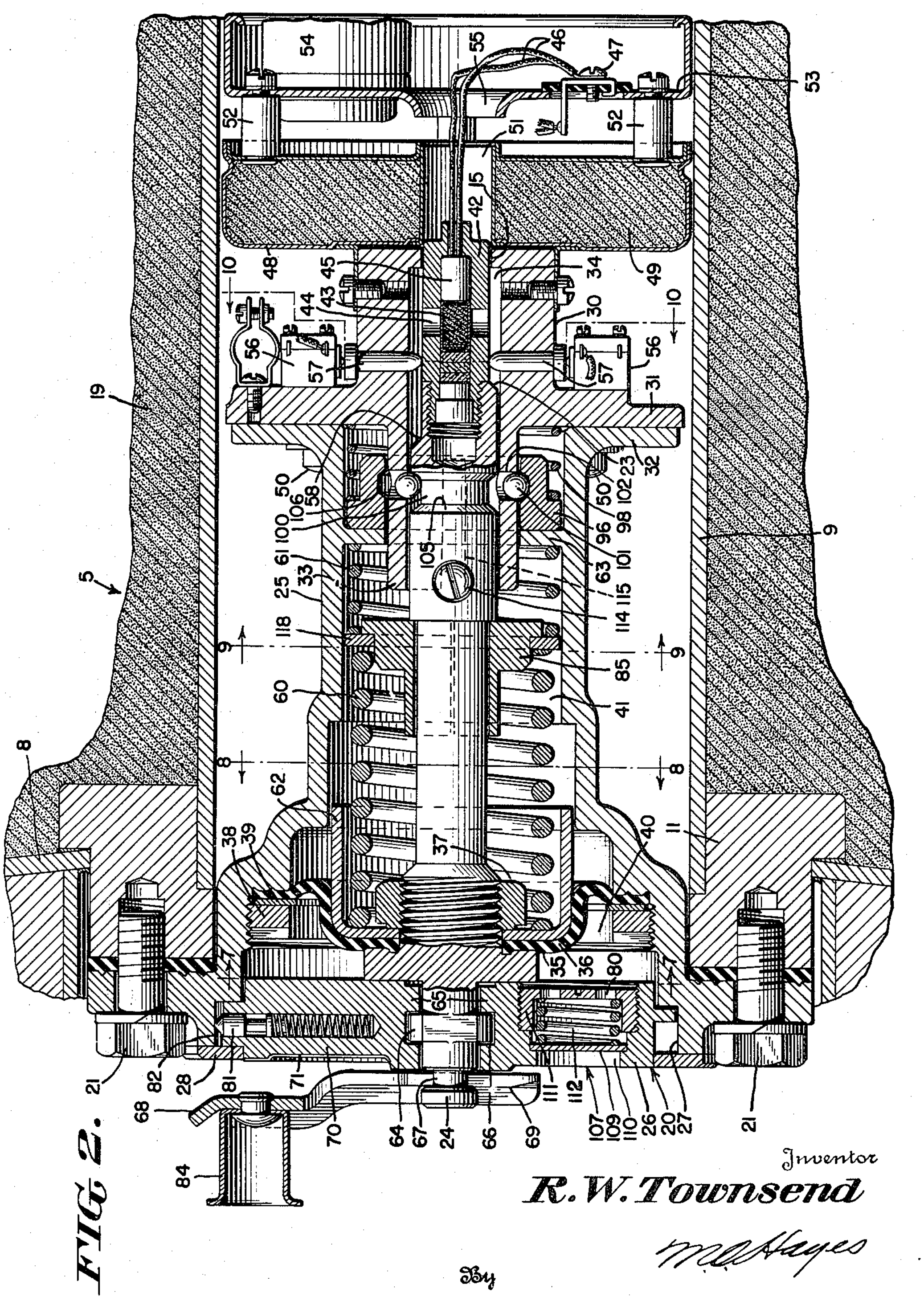
Fig. 2 is a fragmentary vertical sectional view of the device of Fig. 1 with the piston in safe position.
Figure 3:
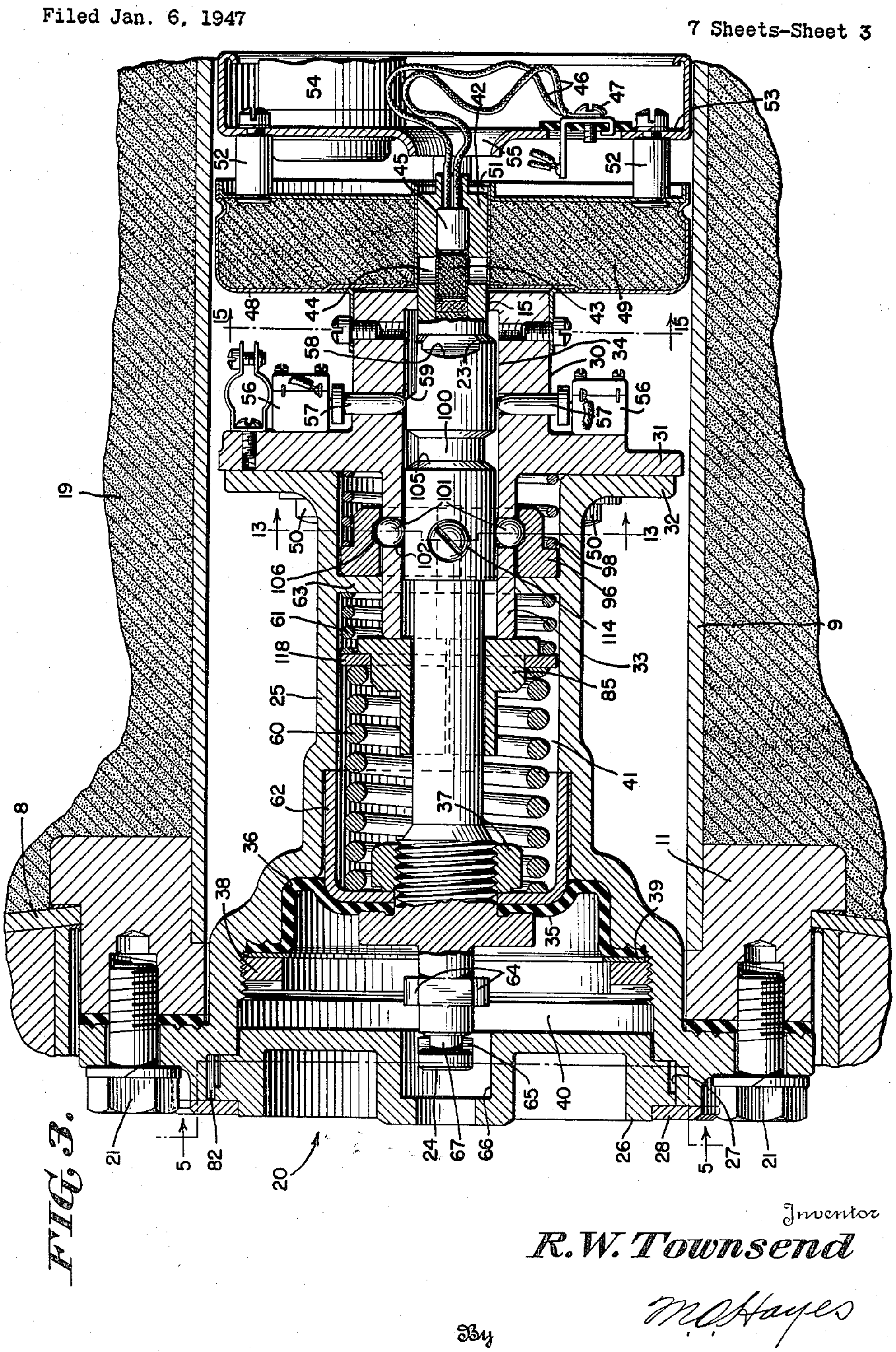
Fig. 3 is a fragmentary vertical sectional view of the device of Fig. 2 with the piston in the operated or firing position.

Fig. 2 is a partly sectional and partly elevational view of the hydrostatically controlled mechanism 20, the piston 24 thereof being shown in an unoperated or safe position. In Fig. 3 the piston is shown in an extended or firing position. The housing 25 of the control mechanism is formed preferably as a casting, one end of which is closed by the setting dial 26 suitably mounted for rotation within the bore 27 and retained therein by ring 28 that is fixedly secured to the housing by screws 29, the arrangement thereof being more clearly shown in Fig. 4. The opposite end of the housing 25 is closed by the guide member 30 having thereon an integrally formed flange portion 31 adapted to register with the mating flange 32 of the housing 25 and secured thereto by screws 50. Slideably supported within the guide surface 34 of guide member 30 is the piston 24 centrally disposed within the housing 25 and adapted for linear movement therein responsively to hydrostatic pressure applied to the surface 35 of the resilient diaphragm 36. This diaphragm is securely connected to the piston by the clamp nut 37 and correspondingly secured to the housing 25 by the application of ring nut 38 and washer 39. This diaphragm is arranged in such a manner as to divide the housing into two compartments that will be hereinafter referred to as the outer compartment 40 and the inner compartment 41.

Threadedly connected with the piston 24 and movable therewith, is the tubular retainer 42 within which is disposed the detonating unit 43 so positioned relative to a plurality of transverse apertures 44 formed therein as to permit radial firing of the detonating unit therethrough at the time of detonation. Also enclosed within the retainer in abutting relation to the detonator 43 is the electroresponsive primer or detonator 45, the leads 46 of which are arranged to pass out through the retainer for connection with the terminals 47, in turn, employed for making connection with the various other elements of the control mechanism 20 and with other elements of the depth charge.

Supported by the guide member 30 and rigidly secured thereto in the manner indicated, is the annular container 48 filled with a suitable booster charge 49, desirably tetryl, with a central opening 51 formed therein preferably of slightly larger diameter than that of the reduced end surface 15 of the guide surface 34 and so centrally aligned therewith as to permit movement therein of the retainer in response to hydrostatically controlled movement of the piston 24. Mounted in spaced relation upon this container 48 by means of studs 52 is the cup-shaped shield 53 functioning as a mounting plate for the terminals 47 and socket 54 used for electrically connecting the various circuits of the depth charge at assembly. The central opening 55 formed therein accommodates the leads 46 of the primer 45 and further facilitates the removal of the retainer 42 without the necessity of dismantling control mechanism 20.

Figures 10, 11, 12:
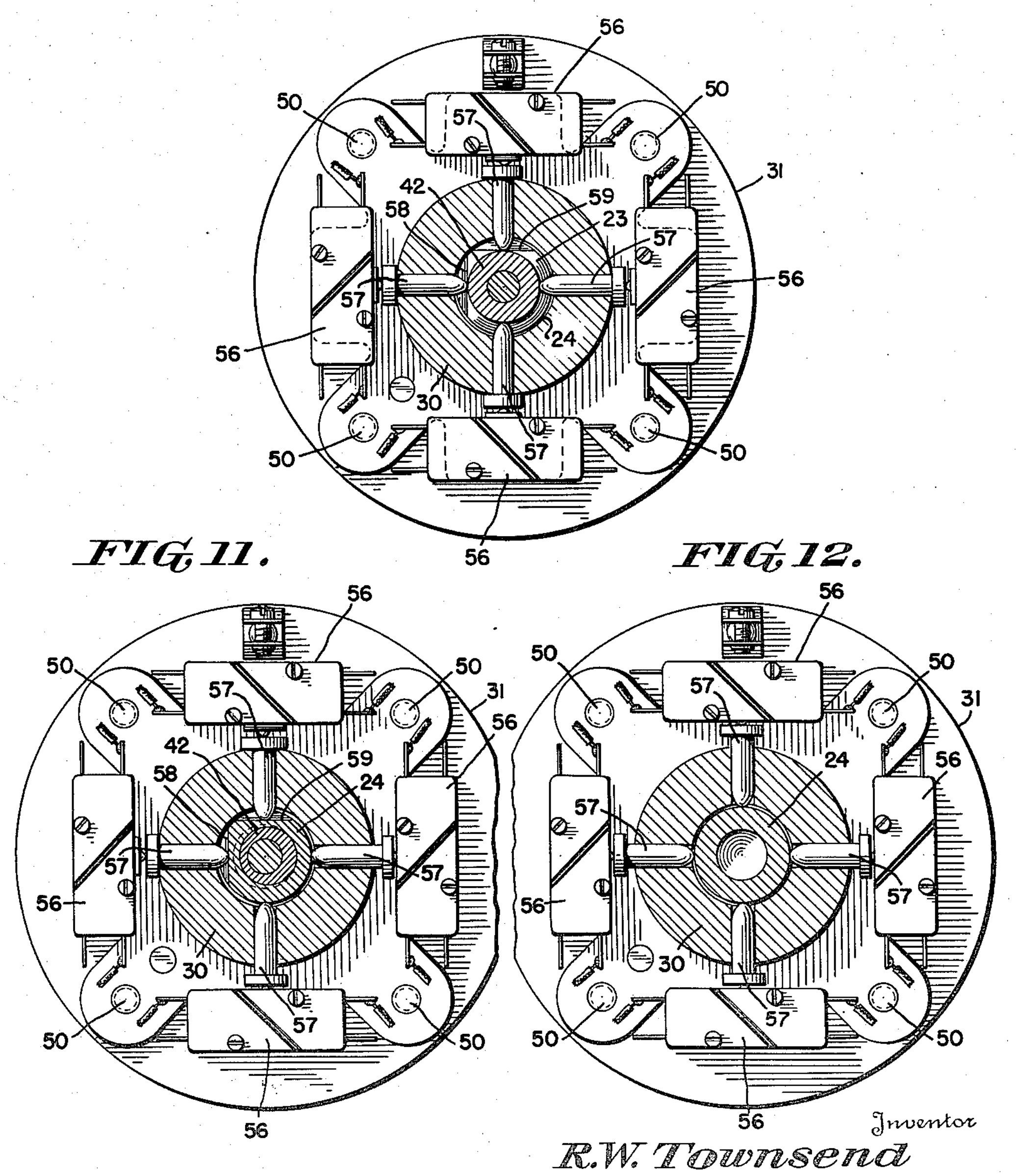
Fig. 10 is a cross-sectional view taken along line 10—10 of Fig. 2.
Fig. 11 is a view similar to Fig. 10 taken when the piston has been moved to its second position.
Fig. 12 is a sectional view similar to Fig. 11 taken when the piston and switch plungers have been moved to the firing position.

Positioned radially around the guide member 30 and secured to the external flange 31 formed thereon, is a plurality of electric switches 56, the contacts of which are controlled by the relative movement of the switch plungers or pins 57, slideably carried by guide member 30, with respect to shoulders 23, 58 and 59 formed on piston 24, as will be more clearly apparent by referring to Figs. 10, 11 and 12 of the drawings.

Normally the piston 24 is yieldably urged into its outward or safe position by the mutually coacting helical springs 60 and 61, working between the cup-shaped guide washer 62, movable with and secured to the piston by nut 37, and the stationary internal flange 63 formed integral with the housing 25. As a safety precaution against possible premature movement of the piston against the positioning springs 60 and 61, the piston is provided with lugs 64 adapted to register in locking engagement with flanges 65 formed in the centrally arranged aperture 66 of the rotating setting dial 26. The relative position of these lugs 64 and flanges 65 when the dial 26 is set in an unlocked or "Service" position is clearly shown on Fig. 5.

Figures 4, 5, 6:
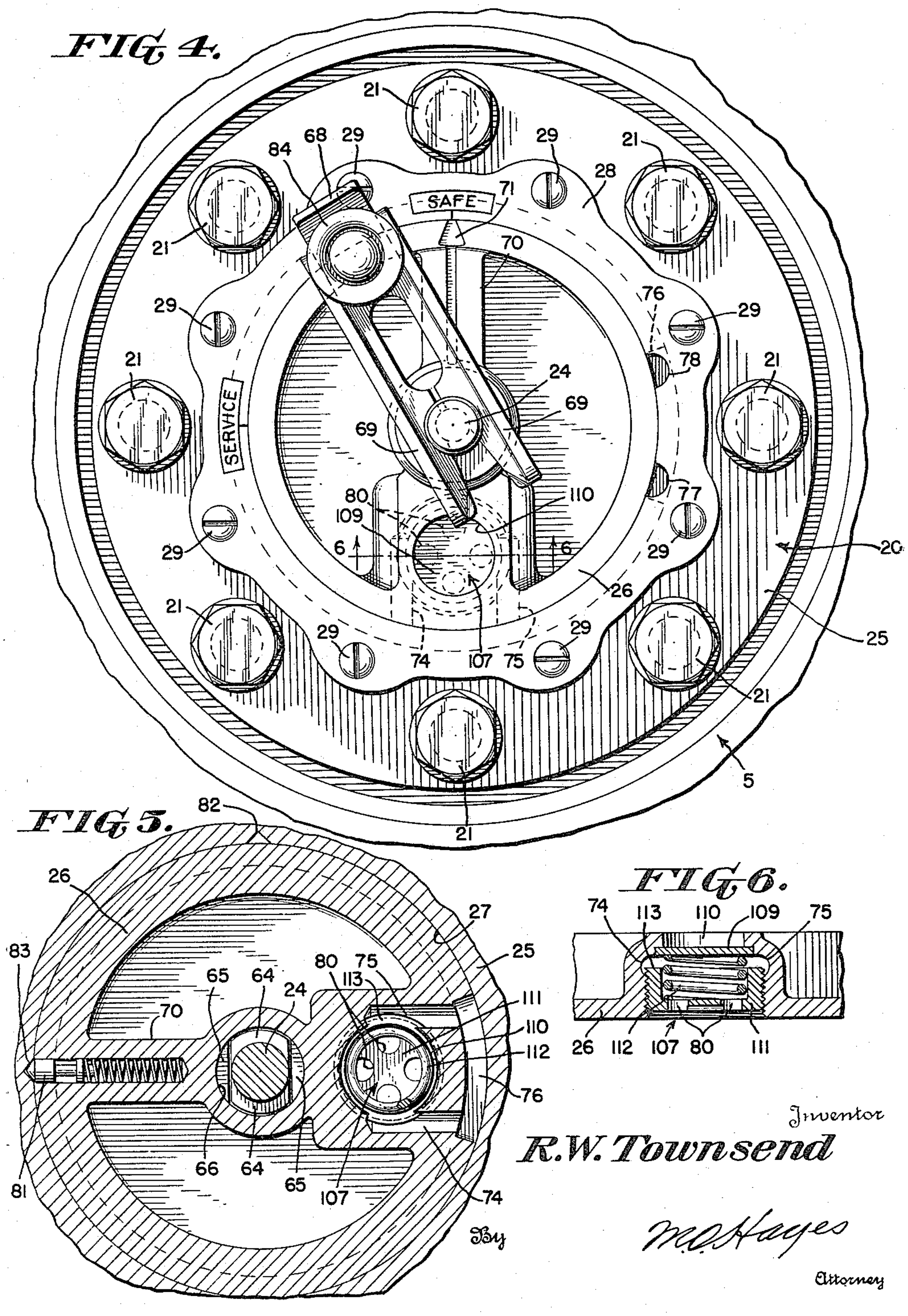
Fig. 4 is a top view of the device shown in safe position.
Fig. 5 is a sectional view taken along line 5—5 of Fig. 3.
Fig. 6 is a fragmentary sectional view through the valve along line 6—6 of Fig. 4.
Figure 7:
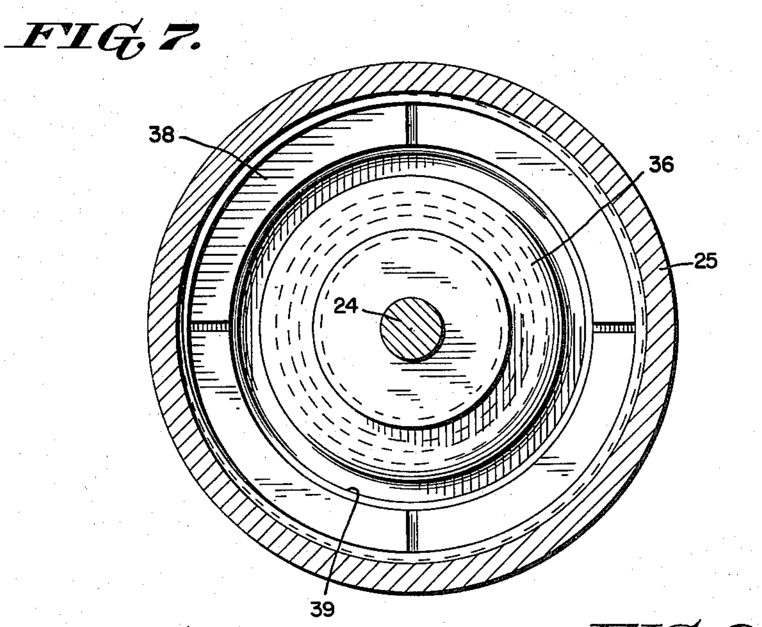
Fig. 7 is a cross-sectional view taken along line 7—7 of Fig. 2.
Figure 8:
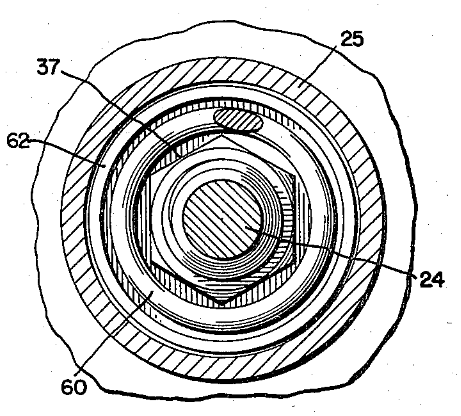
Fig. 8 is a cross-sectional view taken along line 8—8 of Fig. 2.
Figure 9:
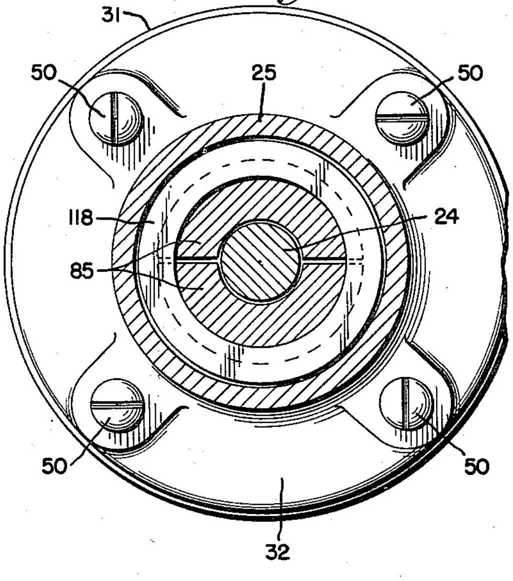
Fig. 9 is a cross-sectional view taken along line 9—9 of Fig. 2.

As an additional safety feature, the extended end of the piston is undercut at 67 for receiving the bifurcated arming fork 68, as shown assembled in Fig. 4, one end of which is provided with a suitable handle whereby the fork may be withdrawn manually when desired or automatically detached from the device at the time of launching. As can be readily understood, the prongs 69 of the fork operate as spring fingers for frictionally gripping the shank of the piston at the undercut portion thereof in interlocking engagement until a predetermined force is applied thereto.

In the operation of the device, the depth charge 5 is prepared for launching by first placing it upon the launching rack or "Y" gun, depending upon which method is to be used in projecting the charge into the water, the operator then manually rotates the setting dial 26 from its "Safe" position as indicated in Fig. 4 by gripping the transverse flange 70 formed thereon and turning the dial counterclockwise until the arrow 71 points to the "Service" position. The turning of the dial also serves to free the piston 24 of its locking engagement therewith by rotating the intersecting flanges 65 out of the path of lugs 64 provided on the piston, as shown in Fig. 5. The dial, when set either in its "Safe" or "Service" position, is yieldably retained therein by means of the spring loaded detent or plunger 81 carried thereby engaging one of the positioning notches 82 or 83 formed in the inner surface of the counterbore 27, Fig. 5. As the depth charge is launched, the arming fork 68, also operating to lock the piston, is forcibly removed by the handle 84 thereof, striking against a stationary projection provided for the purpose on the launching device. The removal of the fork completes the freeing of the piston for linear movement through the housing when influenced by hydrostatic pressure applied to the resilient diaphragm 36 connected therewith.

As the depth charge sinks, after the launching thereof, water under gradually increasing pressure is forced into compartment 40 of the control mechanism 20 through a fluid circuit which is established by the setting of the dial to its "Service" position. In this position of the dial the undercut 76 therein is in alignment with the notches 77 and 78 provided in the retaining ring 28 and thus completes the aforesaid fluid circuit by way of orifices 74 and 75, interconnecting the undercut and a bore 110 in the dial, and perforations 80 in the bottom of the cup-shaped plug 111 threaded into the bore. The pressure of the water entering into compartment 40 actuates the pressure responsive diaphragm 36 causing it to flex inwardly against the counter force of springs 60 and 61, thereby driving the piston and retainer 42 threadedly connected therewith in the direction of the booster charge 49. This inward movement of the piston compresses the springs 60 and 61 in proportion to their respective spring rates. Spring 61 operates only as a slack spring against the washer 118 which serves to retain the two halves of slide 85 sleeved on the piston spring 61, being considerably the weaker of the two springs, is soon compressed thereby allowing the interposing slide 85 to come to rest against the extending neck 33 of the guide member 30. Thereafter further inward movement of the piston is controlled by compression of the stronger spring 60. By calibrating the spring rate of the spring 60 relative to the location of shoulders 23, 58 and 59, formed on the piston, the approximate depths are established at which the shoulders will be brought to bear on the pins 57, thereby to actuate the switches in the desired sequence for closing the various electrical connections in the circuit shown in Fig. 16.

Figure 16:
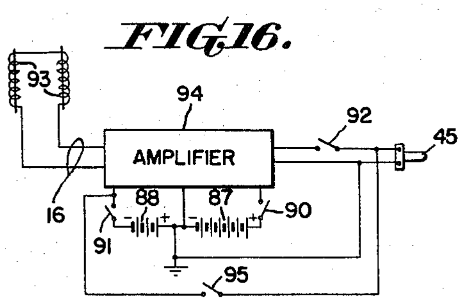
Fig. 16 is a circuit diagram of a complete electrical system suitable for use with the present invention.

The circuit of Fig. 16 illustrates in diagrammatic form one arrangement of the electrical components of the hydrostatically controlled mechanism of the invention, namely the contact closing switch arms of the switches 56 connected to control the operation of the influence firing mechanism 13 and the detonator firing circuit controlled thereby. The energization of the amplifying circuit 94 of mechanism 13 is accomplished by connecting therein batteries 87 and 88 by the closing of switch arms 90 and 91 individual to switches 56 and pins 57 adapted to be actuated by shoulder 23 in response to a predetermined inward movement of the piston to the second position thereof shown in Fig. 11 and corresponding to a predetermined depth of submergence of the depth charge.

As the depth charge sinks to a second predetermined depth beneath the surface of the water, the switch arm 92 of the switch 56 and pin 57 associated with shoulder 58 is closed for electrically arming the primer 45. At this time, the piston has also moved sufficiently to place the detonator 43 in operative relation to the booster charge 49. After arming, the firing of the primer is accomplished automatically by the influence firing mechanism 13 when the depth charge passes within the magnetic field set up by the metal hull of a submarine, as more specifically described in the aforesaid copending application of Waldron S. Macdonald et al. The gradiometer coils 93, referred to hereinbefore as being encased within the capped cylinders 17 and 18 respectively, responding to the interference set up in the earth's magnetic field by the presence of the target directs a signal to the amplifier 94, which in turn, operates to amplify and thereby increase the intensity of the signal to the proportion necessary to fire the primer 45. The position of shoulder 58 is so arranged that the closing of switch arm 92 is delayed until the depth charge reaches the aforesaid second predetermined depth at which it is anticipated that the depth charge will be moving within its effective range of the target. Firing of the depth charge may be further delayed, if desired, by the use of time delayed detonators in the retainer 42, which detonators conveniently may be inserted therein or interchanged prior to launching by reason of the accessible mounting and removable arrangement of the retainer with respect to the piston. Thus, the range of adjustment of the control mechanism may be greatly extended in the use of the time delay fuses.

In the event that the depth charge is not fired by influence and sinks beyond its probable range of response to the submarine, the piston moves to energize an independent and obvious circuit for detonating and thereby destroying the depth charge by closing the switch arm 95 associated with switch 56 and pin 57 adapted to be actuated by cam 59 as the depth charge sinks to a third predetermined depth of submergence.

Figure 13:
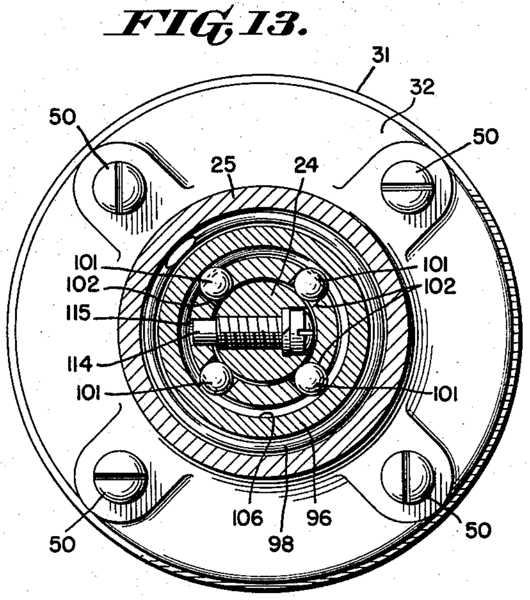
Fig. 13 is a sectional view taken along line 13—13 of Fig. 3.
Figure 14:
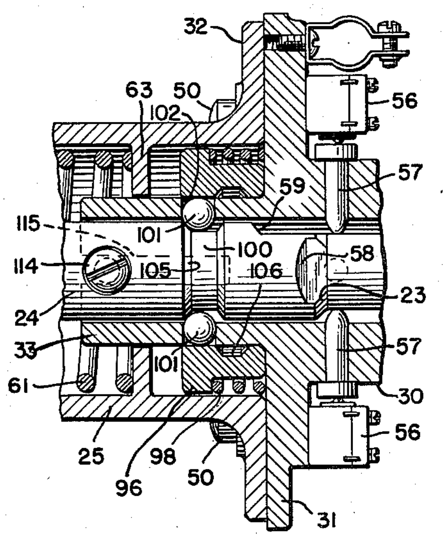
Fig. 14 is a fragmentary sectional view showing the piston in safe or locked position.
Figure 15:
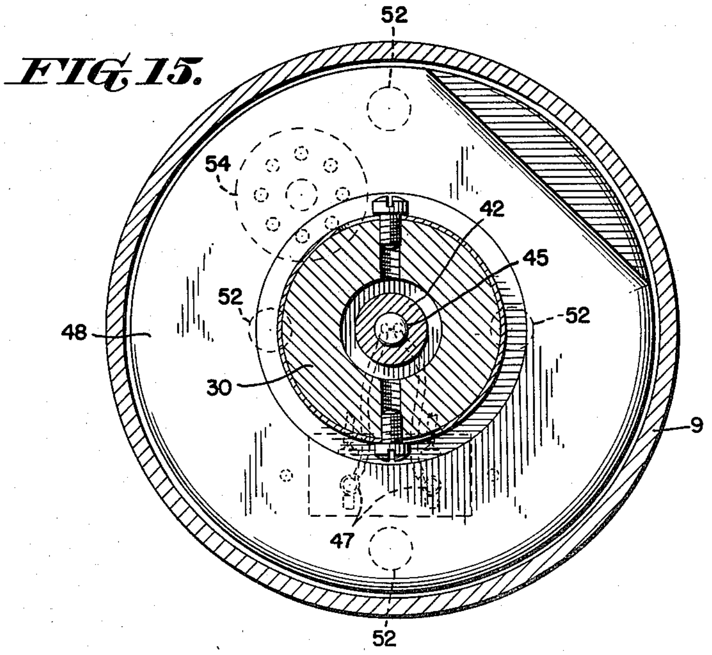
Fig. 15 is a sectional view taken along line 15—15 of Fig. 3.

For proper functioning of the device certain safety features are incorporated therein which operate to cause normal functioning of the mechanism even under the most abnormal conditions. One example of such a condition is severe shock. It has been heretofore stated that these depth charges are generally launched by means of a "Y" gun, which directs and propels the charge high into the air before striking the water with considerable force at some distance from the vessel. Normally such a shock, if received counter to the movement of the piston 24, could conceivably impart sufficient inertia to this member as to cause it to move against the spring 60 with sufficient force to move the detonator into operative position with the booster charge 49 and in so doing close the switches and thereby possibly cause premature detonation of the charge. To provide against such a contingency, an inertia ring 96 is slideably arranged over the extending neck 33 of the guide member 30 and yieldably urged against flange 63 by a spring 98 interposed between the inertia ring and flange 31 of the guide member. The inertia ring responds to such a shock by moving away from flange 63 against the opposing force of spring 98, thereby to cam a plurality of balls 101, movable within diametrically arranged apertures 102 formed in the neck 33 of the guide, into locking engagement with the annular groove 100 provided on the piston, as shown in Fig. 14, and thereby prevent movement of the piston in the direction of the booster charge until such time as the inertia force is relieved. When this occurs the inertia ring is returned by spring 98 to its former position against the flange 63. Normally, however, the piston is free to move gradually under hydrostatic influence in the direction of the booster charge, the shoulder 105 of groove 100 formed therein, acting to cam the balls 101 outwardly into the annular groove 106 provided in the inner surface of the ring as shown in Fig. 13. The groove 106 also is preferably cam-shaped to cam the balls into groove 100 on the piston in response to movement of the inertia ring as stated hereinbefore.

Also incorporated within the device is the pressure responsive valve structure 107 arranged within the dial 26 and operable to control the flow of liquid into the outer compartment 40 and thereby prevent the piston from reacting to sudden abnormal increases in pressure as would be applied to the diaphragm during countermining or explosion of other depth charges within the vicinity of the present depth charge. This valve structure includes the disk or plate 109 which is yieldably retained across the opening 110 by the spring 112 working between this disk and the perforated plug 111. This valve structure is so arranged that fluid under gradually increasing pressure will by-pass the disk and enter the outer compartment of the control mechanism through ports or notches 77 and 78. If the external pressure is suddenly increased, the disk 109, exposing a larger surface area to the pressure than the ports 77 and 78, is driven inwardly against the spring 112 to seat against the lip or rim 113, Fig. 6, of the plug 111, thereby stopping further passage of water through the perforated plug 111 until such time as the external pressure is relieved. The spring in responding to the reduction in pressure acts to return the disk 109 to its former position across the opening 110 and the normal functioning of the control mechanism thereafter is continued.

The angular or rotative positioning of the piston relative to the housing is obtained by means of the stud screw 114, Fig. 13, threadedly connected to the piston and working within a longitudinal slot 115 cut in the neck 33 of the guide member.

It will be understood that this invention has been described with respect to a preferred embodiment thereof, and that whereas specific switch arrangements and sequence of actuation of the switches by the piston associated therewith have been disclosed by way of example, other switch arrangements may be employed to provide different operations of the depth charges employing the device of the present invention. For example, switch arm 95, Fig. 16, may be employed to short circuit either one or both of batteries 87 and 88, thereby to sterilize the depth charge, rather than to fire it as provided by the circuit of Fig. 16. Moreover, additional embodiments, modifications and variations in the structure and assembly may be resorted to without departing from the spirit and scope of the invention as defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In a depth charge of the character disclosed, a housing, a pressure responsive diaphragm arranged within said housing in communication with the surrounding water, a piston member movable by said diaphragm in response to hydrostatic pressure applied thereto, a guide for said piston having a plurality of apertures therein, inertia responsive means including a ring member slideably arranged over a portion of said guide and adapted to be moved into a locking position thereon for momentarily locking the piston thereto in response to a sudden shock received by the depth charge, spring means adapted to yieldably urge said ring member into an unlocking position, a plurality of balls diametrically arranged in said apertures and adapted to lock the piston to the guide when said ring member moves into said locking position, a plurality of switches arranged on said guide, means associated with the switches and with the piston for actuating the switches in predetermined sequence in response to a predetermined movement of the piston, an electroresponsive detonator, and means adapted to be rendered effective in successive steps by said switches for firing said detonator as the depth charge moves into proximity with a target.

2. In a depth charge adapted to be launched within a body of water, the combination of a casing, an explosive charge arranged within said casing, an electroresponsive detonator adapted to fire said explosive charge, a flexible diaphragm secured to said casing and having one side thereof in communication with the water, a plunger connected to said diaphragm and movable thereby from a safe position to a predetermined firing position, spring means for yieldably urging the plunger into said safe position, a guide member for the plunger, means for releasably locking the plunger to said guide member, said locking means including an inertia ring slideably sleeved on the guide member, a plurality of balls carried by the guide member and adapted to be moved into locking engagement with the plunger in response to a predetermined movement of the inertia ring, a plurality of switches arranged on the guide member, means communicating with the plunger for actuating said switches from an open circuit position to a closed circuit position in response to movement of the plunger from said safe position to said predetermined firing position, a plurality of firing circuits for said detonator controlled by said switches, one of said firing circuits being arranged to operate the detonator as the plunger reaches said predetermined firing position, and means connected in another one of said firing circuits and including a detector responsive to changes in a magnetic condition caused by movement of the depth charge in proximity to a submarine for effecting the operation of the detonator when the rate of change in the magnetic condition reaches a predetermined value before the piston reaches said predetermined firing position.

3. In a depth charge of the character disclosed adapted to be launched within a body of water, the combination of a casing, an explosive charge arranged within said casing, a housing secured within said casing, a pressure responsive diaphragm arranged within said housing, a rotatable dial member interposed between said diaphragm and the surrounding water, said dial member having an opening therein adapted to permit the entrance of water therethrough to the outer surface of said diaphragm upon the rotation of the dial member to a predetermined position, means responsive to a predetermined impulse of pressure received through the surrounding water for closing said opening against passage of water therethrough, a rod like piston connected to said diaphragm and movable thereby in an inward direction within said housing in response to an increase of hydrostatic pressure gradually applied to the diaphragm, said piston having a plurality of cam surfaces thereon, an electroresponsive detonator connected to said piston and movable thereby from an initial safe position to a firing position with respect to said explosive charge, spring means for yieldably urging the piston into said initial position, a guide member for the piston, means including an inertia ring slideably arranged over said guide member for momentarily locking said piston to the guide member in response to a sudden shock received by the depth charge as it strikes the water, a second spring means adapted to yieldably urge said inertia ring into an unlocking position, a plurality of switches arranged on said guide member, a plurality of circuits respectively controlled by said switches, means coacting with said cam surfaces and adapted to cause said switches to close said circuits in predetermined sequence as the piston moves from said initial position to the firing position, and means adapted to be rendered effective in successive steps by said circuits for firing said detonator when the depth charge moves into proximity to a target.

4. In a depth charge of the character disclosed adapted to be launched within a body of water, the combination of a casing, an explosive charge arranged within said casing, a housing secured within said casing, a pressure responsive diaphragm arranged within said housing, a rotatable dial member interposed between said diaphragm and the surrounding water, said dial member having an opening therein adapted to permit the entrance of water therethrough to the outer surface of said diaphragm when the dial member has been rotated from an initial position to a predetermined position, means for momentarily closing said opening against passage of water in response to a sudden shock of predetermined pressure applied thereto, a rod like piston connected to said diaphragm and adapted to be moved thereby in an inward direction within said housing in response to an increase of hydrostatic pressure applied gradually to said diaphragm, said piston having a plurality of cam surfaces thereon, means included in said dial member for releasably locking said piston to said housing when the dial member is in said initial position, an electroresponsive detonator connected to the piston and movable thereby from a safe position to a firing position with respect to said explosive charge, said detonator being adapted to explode said charge when energized, a guide member for the piston secured to said housing; a plurality of switches arranged on said guide member in normal open circuit position, a plurality of switch actuating means respectively adapted to be actuated by said cam surfaces to close said switches in predetermined sequence as the piston moves from said safe position to the firing position, and means responsive to the rate of change in the magnetic condition about said depth charge and adapted to be rendered effective in successive steps by said switches for causing the detonator to be energized when said rate of change reaches a predetermined value.

5. A depth charge according to claim 4 but further characterized in that the piston is adapted to be moved to a second firing position beyond the first named firing position and an additional switch closable upon movement of said piston to said second firing position to complete a circuit for energizing the detonator.

6. In a depth charge of the character disclosed, the combination of a casing having an explosive charge therein, an electroresponsive detonator for firing the explosive charge, a piston having a plurality of cam surfaces arranged thereon and adapted to move the detonator from an initial safe position into firing relation with respect to the explosive charge, means responsive to changes in the pressure of the surrounding water for causing said movement of the piston as the depth charge descends through the water, a plurality of switches within said casing and adapted to be closed in predetermined sequence by said cam surfaces in response to said movement of the piston, means including an amplifier for generating a signal of sufficient strength to fire the detonator as the depth charge moves into proximity to a target, a source of power, a circuit including one of said switches for connecting said amplifier to the source of power before the detonator is moved into firing relation with respect to the explosive charge, a firing circuit including a second one of said switches for connecting the detonator to the output of the amplifier as the detonator is moved into firing relation with respect to the explosive charge, and a second firing circuit including a third one of said switches for firing the detonator from said source of power when the piston has been moved a predetermined distance after said second switch has been closed.

7. In a depth charge of the character disclosed adapted to be launched within a body of water, the combination of a casing, an explosive charge arranged within said casing, a flexible diaphragm secured to said casing and having one side thereof in communication with the water, a rod-like piston connected to said diaphragm and adapted to be moved thereby in an inward direction in response to hydrostatic pressure applied to the diaphragm, an electro-responsive detonator connected to said piston and movable thereby from a safe position to a firing position with respect to said explosive charge and adapted to explode said charge when energized, a stationary guide member for said piston, a plurality of switches arranged on said guide member in normal open circuit position, said piston having a plurality of cam surfaces arranged thereon, a plurality of switch actuating means adapted to be actuated by said cam surfaces to close said switches in predetermined sequence as the piston moves said detonator from said safe position to the firing position, a plurality of circuits respectively adapted to be actuated by said switches, magnetically responsive means electrically controlled by said circuits and effective to cause the energization of the detonator after the detonator has been moved to the firing position, and inertia responsive means operable to momentarily lock said piston to said guide member when a force is suddenly applied to the depth charge in the opposite direction to the normal movement of the piston toward said firing position.

References Cited in the file of this patent

FOREIGN PATENTS

| | | |
|---|---|---|
| 263,985 | Italy | Apr. 10, 1929 |
| 803,907 | France | July 20, 1936 |
| 347,134 | Italy | Mar. 18, 1937 |